United States Patent [19]

Takayama et al.

[11] Patent Number: 5,568,223
[45] Date of Patent: Oct. 22, 1996

[54] MULTIPLE POINT FOCUS DETECTION CAMERA

[75] Inventors: Toru Takayama, Kawasaki; Tsutomu Narisawa, Saitama-ken; Hitoshi Imanari, Yokohama, all of Japan

[73] Assignee: Nikon Corporation, Tokyo, Japan

[21] Appl. No.: 353,364

[22] Filed: Dec. 2, 1994

[30] Foreign Application Priority Data

Dec. 14, 1993 [JP] Japan .................................. 5-313680

[51] Int. Cl.⁶ .................................................. G03B 13/36
[52] U.S. Cl. ........................................ 396/123; 396/147
[58] Field of Search .................................. 354/400–409, 354/195.1

[56] References Cited

U.S. PATENT DOCUMENTS 4,994,843  2/1991  Kitazawa ................................. 354/409
5,235,380  10/1993  Yamada et al. ....................... 354/409 X Primary Examiner—W. B. Perkey
Attorney, Agent, or Firm—Oliff & Berridge

[57] ABSTRACT

A multi point focal detection camera is switchable between an automatic mode and a manual mode. An automatic focusing system focuses a movable lens system having a lens on a selected one of multiple focus detection areas in accordance with either focus detection data or a focus detection area selection lever. A CPU enables the selected one of the multiple focus detection areas to be changed to another of the multiple focus detection areas without changing the operation mode. Once the lens system is focused on the selected focus detection area, the selected focus detection area can be changed by displacing the focus detection area selection lever within a predetermined period of time. If the selected focus detection area is changed to another of the multiple focus detection areas, the automatic focusing system focuses the lens system on the new focus detection area.

27 Claims, 6 Drawing Sheets

MULTIPLE POINT FOCUS DETECTION CAMERA

BACKGROUND OF THE INVENTION

1. Field of the Invention

This invention relates to a multiple point focus detection camera that accomplishes the focusing operation on the basis of focus detection data measured by the specific focus detection area from among multiple focus detection areas.

2. Description of Related Art

Conventionally, a camera endowed with a focus detector establishes a focus detection area 8 in the center of the finder field of vision 9 in the manner shown in FIG. 3. In the focus detection area 8, focus detection is accomplished such that the lens is moved to focus on the subject within the focus detection area 8.

However, when the focus detection area 8 is in the center of the finder field of vision 9 as shown in FIG. 3, and if the primary photographic subject intended by the photographer is not found within the center of the finder field of vision 9, the photographs may be taken when focusing on a subject other than the primary photographic subject.

Therefore, as shown in FIG. 4, multiple focus detection areas 8 are established in the finder field of vision 9, from which a selection is made of a specific area. The camera is constructed so as to focus the lens relative to the photographic subject within the selected area. With such a camera, two methods are known for the selection of an area from the multiple focus detection areas 8. In a first method, one focus detection area from the multiple focus detection areas 8 is selected by the photographer. The lens is then focused on the subject in the selected area. In the second method, the focus is detected in all of the areas of the multiple focus detection area 8, and through the processing of the received focus detection data, a selection is made of an area in which the primary subject exists, thus comprising a method in which the lens is focused on the photographic subject in the selected area. In this instance, as a standard for the selection of the focus detection area, construction may be such that selection is made of a focus detection area in which the distance is closer to the camera. Conventionally, from these two methods, the first method has been called the manual mode, and the second method has been called the automatic mode, cameras being known in which both capabilities are provided, both of them being selectively used by the photographer.

An explanation is provided hereafter of a conventional multiple point focus detection camera that is provided with both a manual mode and an automatic mode.

FIGS. 7 and 8 show an external view of such a conventional camera. With a multiple point focus detection camera there is provided a power switch 3, a release button 4, a display window 5, a mode change button 6, and a command dial 10 arranged on the top of the camera body 1. The area selection lever 7, which is used by the photographer to select the area when operating in the manual mode, is attached to the rear surface of the camera body in FIG. 7 and is attached to the side surface of the lens 2 in FIG. 8.

Next, an explanation will be provided of the operation of a calculation controller or CPU, to determine the point for focusing from focus detection in a multiple point focus detection camera with reference to FIG. 5.

First, in step S201, if the release button 4 is half depressed, then the calculation controller accomplishes focus detection in step S202. Next, the calculation controller determines whether the mode selected in step S203 is the manual mode or the automatic mode. If the automatic mode is selected, the calculation controller moves to step S204, and the focus detection data relevant to the entire focus detection area 8 is detected. In step S205, the calculation controller accomplishes the calculations on the basis of a specified algorithm, wherein a determination is made as to the focus detection area in which the subject exists, the established focus detection area being displayed in the focus detection area (step S206).

Furthermore, in step S207, in order to focus on the subject within the established focus detection area, the calculation controller calculates the amount of drive of the AF (automatic focus) motor required to focus, on the basis of the focus detection data of this area. In step S208, the AF motor is driven by an amount corresponding to the AF motor controller. Finally in step S209, the calculation controller receives the drive of the AF motor, and focusing is accomplished through the movement of the focusing lens in the direction of the optical axis. In step S210, the operation waits for the full depression of the release, and photography is accomplished when the release button has been fully depressed.

In step S203, when the established mode is the manual mode, the calculation controller moves to step S216 and only detects the focus detection data of the focus detection area selected by the area selection lever 7. The calculation controller moves to step S207 and accomplishes both focusing and photography.

With the automatic mode in the conventional arrangement, since the selection of a specific area is automatically accomplished on some basis, occasionally selection will be made of an area in which the photographic subject is different from the primary subject recognized by the photographer. In such an instance, the photographer will have to switch from the automatic mode to the manual mode and again situate the camera and push the release button.

On the other hand, in the manual mode, since selection of the area of the primary subject intended by the photographer is accomplished manually, there is an advantage in that a picture can be taken in accordance with the desired composition of the photographer. However, since focusing is accomplished in a pre-established area, if the photographer forgets that the camera is in the manual mode, there is a possibility that a picture may be taken while focusing on other than the primary subject.

In this manner, with a multiple point focus detection camera provided with a conventional automatic mode and manual mode, there is a need for frequent changing from the manual to the automatic mode, which is time consuming and inefficient.

SUMMARY OF THE INVENTION

An object of the present invention is to provide a multiple point focus detection camera that provides positive focusing on the primary photographic subject intended by the photographer, while providing for efficient operation.

With the multiple point focus detection camera of embodiments of the present invention, the focus detector accomplishes focus detection relevant to multiple focus detection areas. A calculation device or CPU handles the focus detection data of the focus detector on some basis, the specific area from among the multiple focus detection areas being automatically selected, and the amount of lens movement required to focus the lens being accomplished through the utilization of the focus detection data of the specified area. The calculation device, following the establishment of the specified area, obtains the amount of lens movement required to focus the lens through the utilization of the other area focus detection data when an indication is received from the photographer and implemented, indicating a change to an area from the specified area as indicated by an area change reception and implementation device. In this manner, even when the area in which the primary subject intended by the photographer exists is different from the specified area determined by the calculation device, through the indication of an area change by the photographer relative to the area change reception and implementation device, the area of focus can be changed to the area intended by the photographer.

Furthermore, even when the area in which the primary subject intended by the photographer exists differs from that of the area selected by the calculator, unlike the prior art, there is no need to change to the manual mode during photography, and photography can be automatically accomplished simply by an operation in which an area change is indicated. By this structure, the shutter release need not be left up to chance, and photography can be efficiently accomplished, wherein the composition focuses on the primary subject intended by the photographer.

BRIEF DESCRIPTION OF THE DRAWINGS

The invention will be described in detail with reference to the following drawings in which like reference numerals refer to like element and wherein.

DETAILED DESCRIPTION OF PREFERRED EMBODIMENTS

An explanation of an embodiment of a multiple point focus detection camera according to the present invention will be provided hereafter with reference to the drawings.

Figure 1:
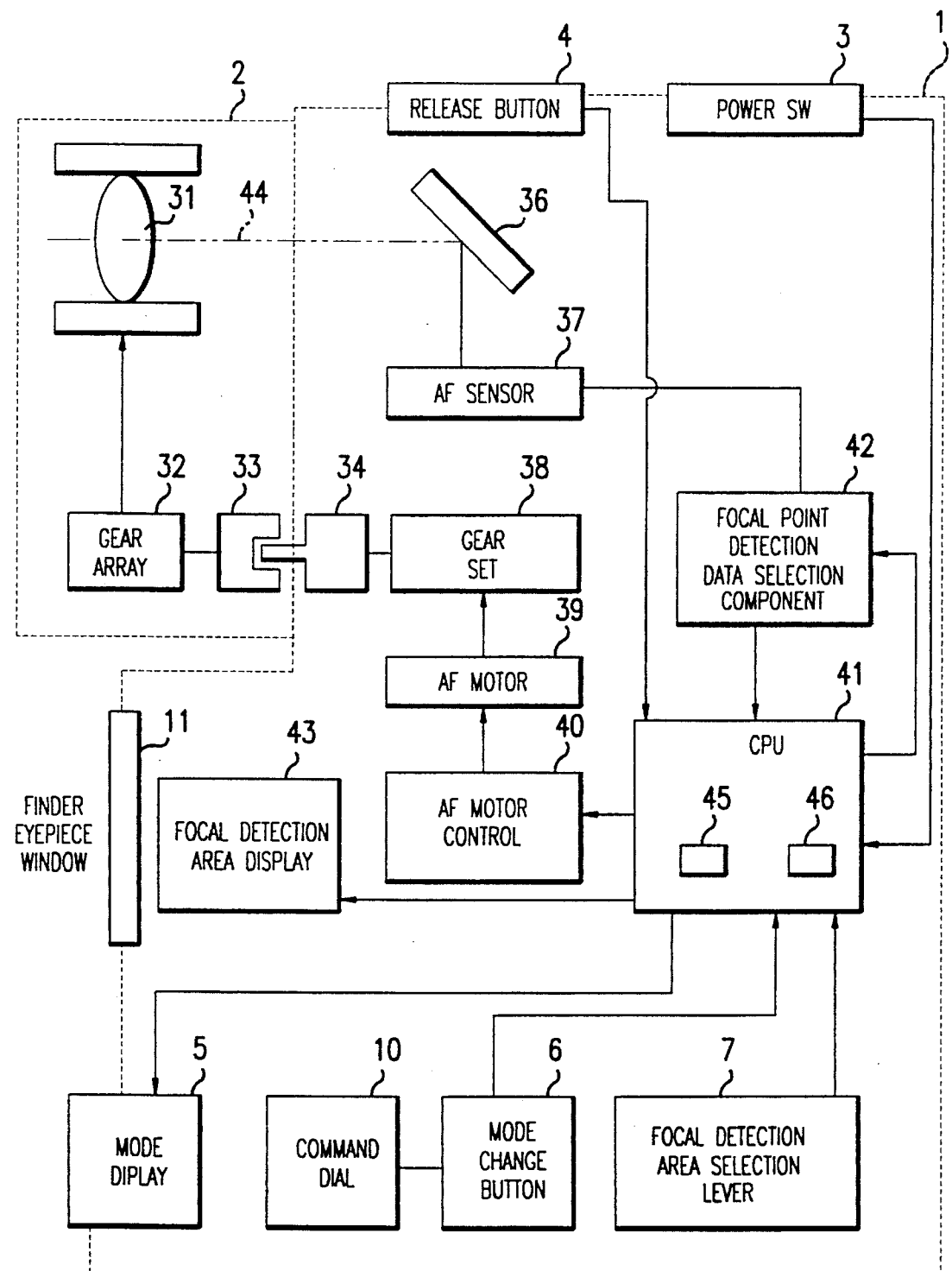
FIG. 1 is a block diagram that shows the composition of an embodiment of a multiple point focus detection camera according to the present invention.

The multiple point focus detection camera of the embodiment is composed of a camera body 1 and an interchangeable lens 2 as shown in FIG. 1.

A lens system (not shown in the drawing) is arranged in lens 2, in which a focusing lens system 31 is movable in the direction of the optical axis 44 through a focusing gear set 32.

Within the camera body 1 is established an electric power switch 3 that provides electricity to the camera body 1, a release button 4, and a finder eyepiece 11. The arrangement includes a mirror 36, an AF sensor 37, which detects the amount of aberration between the focus of the focusing lens system 31 and the subject positioned in the three focus detection areas 58a, 58b, and 58c shown in FIG. 6 for example. Also provided are a focus detection data selection component 42, which selects the focus detection data, a mode change button 6, which receives changes in the established mode as indicated by the photographer, a command dial 10, a mode display 5, which displays the established mode, and a selection lever 7, which enables the photographer to select the focus detection area. The camera also includes a focus detection area display 43, which displays the selected focus detection area, and a calculator control component or CPU 41, which controls the focus detection and focusing operations. An AF motor 39 is also provided for sending the drive force to the gear set 32 of the lens 2, a gear set 38, and an AF motor control component 40, which controls the AF motor 39. An optical system to accomplish photography is also provided including a shutter and photographic film, not shown in the drawing.

Couplings 33 and 34 transmit the drive force of the gear set 38 within the camera body 1 to the gear set 32 within lens 2.

The mode change button 6 and the command dial 10 receive the selection from the photographer in which selection is made of either the automatic mode or the command mode, which two modes determine how the determination is made as to the area that will be utilized in the focusing of the multiple focus detection areas. To change the mode, the photographer rotates the command dial 10 while depressing the mode change button 6.

In the manual mode, which comprises one of the two modes, the intention of the photographer is effected through the operation of the lever 7 for selecting the focal detection area from among the focal detection areas 58a, 58b, and 58c. The focusing lens system 31 focuses within the selected area, and photography is accomplished. In the manual mode, the area selection lever 7 is shifted to alter the focus detection area.

Figure 6:
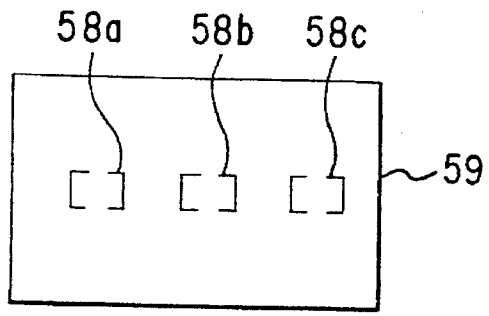
FIG. 6 is an explanatory diagram that shows the focus detection area position of a multiple point focus detection camera according to FIG. 1.

In the automatic mode, the primary subject from among the focus areas 58a, 58b, and 58c shown in FIG. 6 is determined by the CPU 41 through a calculation using focus detection data. The focus lens system 31 is focused in the established area, and photography is accomplished. In this embodiment, when there is a difference between the focus detection area established by the CPU 41 and the focus detection area desired by the photographer, changing the focus detection area is performed through the operation of the selection lever 7. The timing for the receiving and implementing of changes in the focus detection area is restricted to those instances in which the area selection lever 7 is operated within a preestablished time, following the establishment of the focus detection area in which focusing is accomplished by means of the CPU 41.

The CPU 41 is connected to the electric power switch 3, focus detection data selection component 42, focus detection area selection mode change button 6, and focus detection area selection lever 7. Signals received from these components are processed to control the AF motor control component 40, the focus detection area display 43, and the mode display 5. In addition, CPU 41 is equipped with memories 45 and 46. A program for operating the CPU 41 is pre-stored in memory 45. The mode established by the mode change button 6 and the area selected by the focus detection area selection lever 7 are stored in memory 46. In addition, the CPU 41 reads the program that is stored within memory 45, on the basis of which operations are accomplished. In addition, CPU 41 predisplays the mode stored within memory 46 (the automatic mode or the manual mode), on the mode display 5.

Next, an explanation is provided hereafter of the external view of the camera according to the present embodiment. The external view of the camera according to the present embodiment is the same as the external view of the conventional camera shown in FIGS. 7 and 8. Therefore an explanation will be provided hereafter with reference to FIGS. 7 and 8.

Figure 7A:
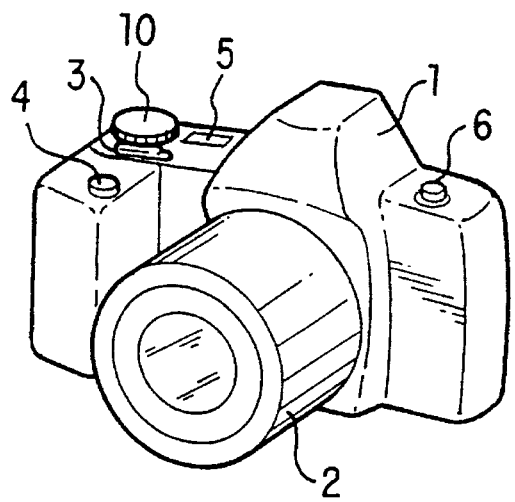
FIG. 7a is an oblique drawing that shows the exterior of a conventional multiple point focus detection camera.
Figure 7B:
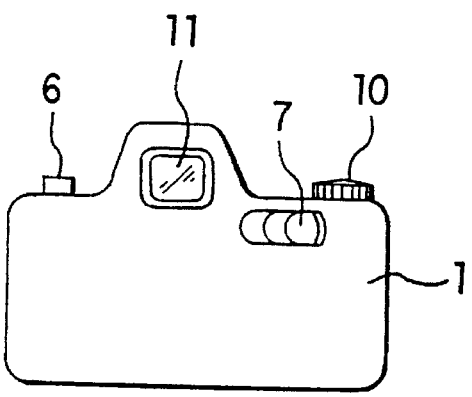
FIG. 7b is a rear surface drawing of an external view of the conventional multiple point focus detection camera.
Figure 8:
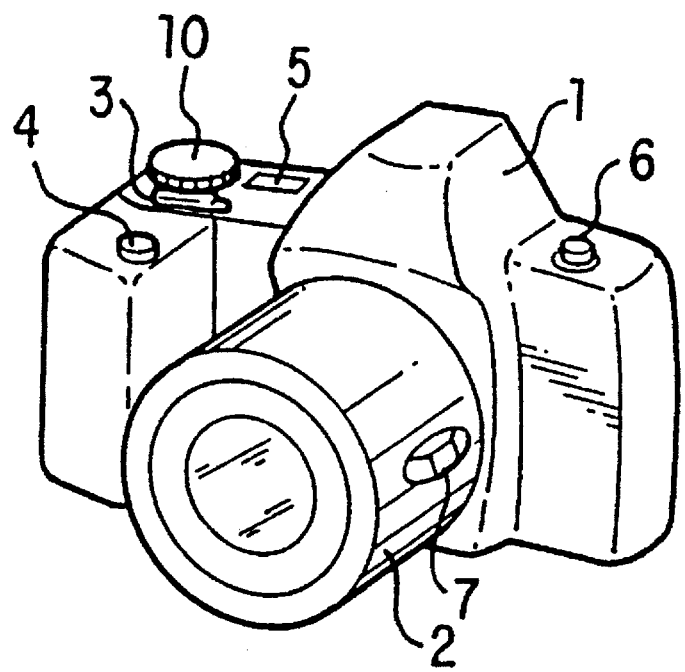
FIG. 8 shows an oblique view of the external view of a conventional multiple point focus detection camera.

On the top of the camera body 1 are arranged an electric power switch 3, a release button 4, a mode display 5 that displays the established mode, a mode change button 6 that receives and implements the mode changes, and a command dial 10. With reference to FIG. 7, on the rear surface of the camera body 1 are arranged a finder eye-piece window 11 and an area selection lever 7. In FIG. 8, the area selection lever 7 is attached to a side surface of the lens 2.

Figure 2:
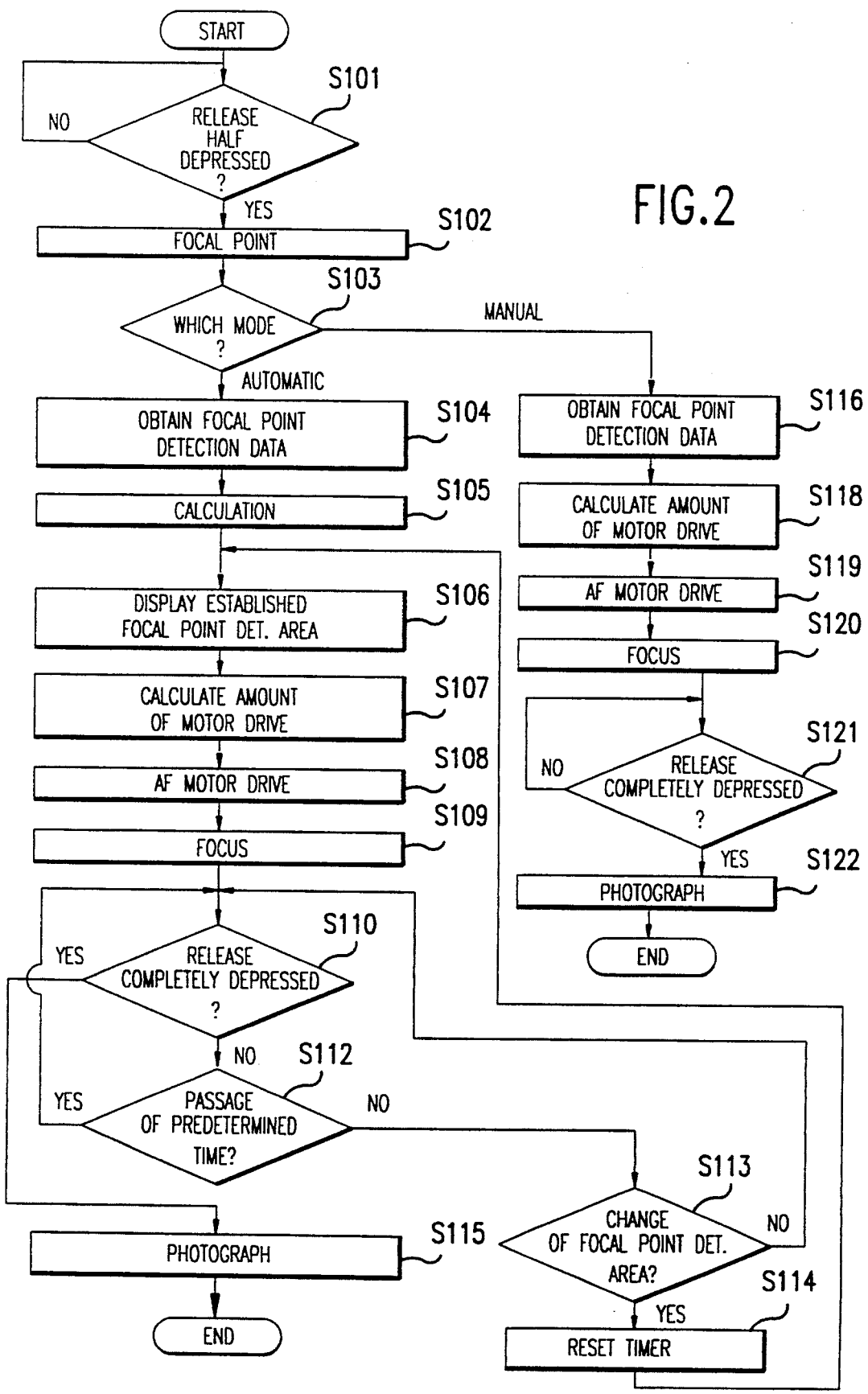
FIG. 2 is a flow chart that shows the operation of the multiple point focus detection camera of FIG. 1.
Figure 3:
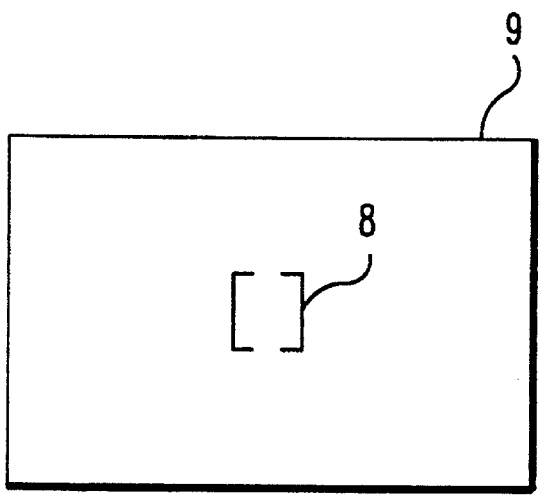
FIG. 3 is an explanatory diagram that shows the position of the focus detection area of a conventional focus detection camera.
Figure 4:
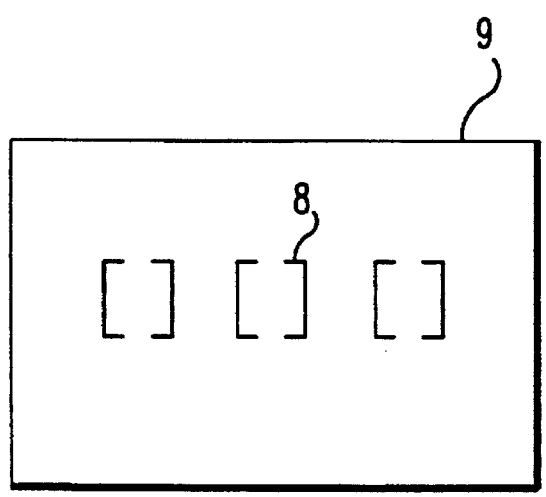
FIG. 4 is an explanatory diagram that shows the position of the focus detection area in a conventional multiple point focus detection camera.
Figure 5:
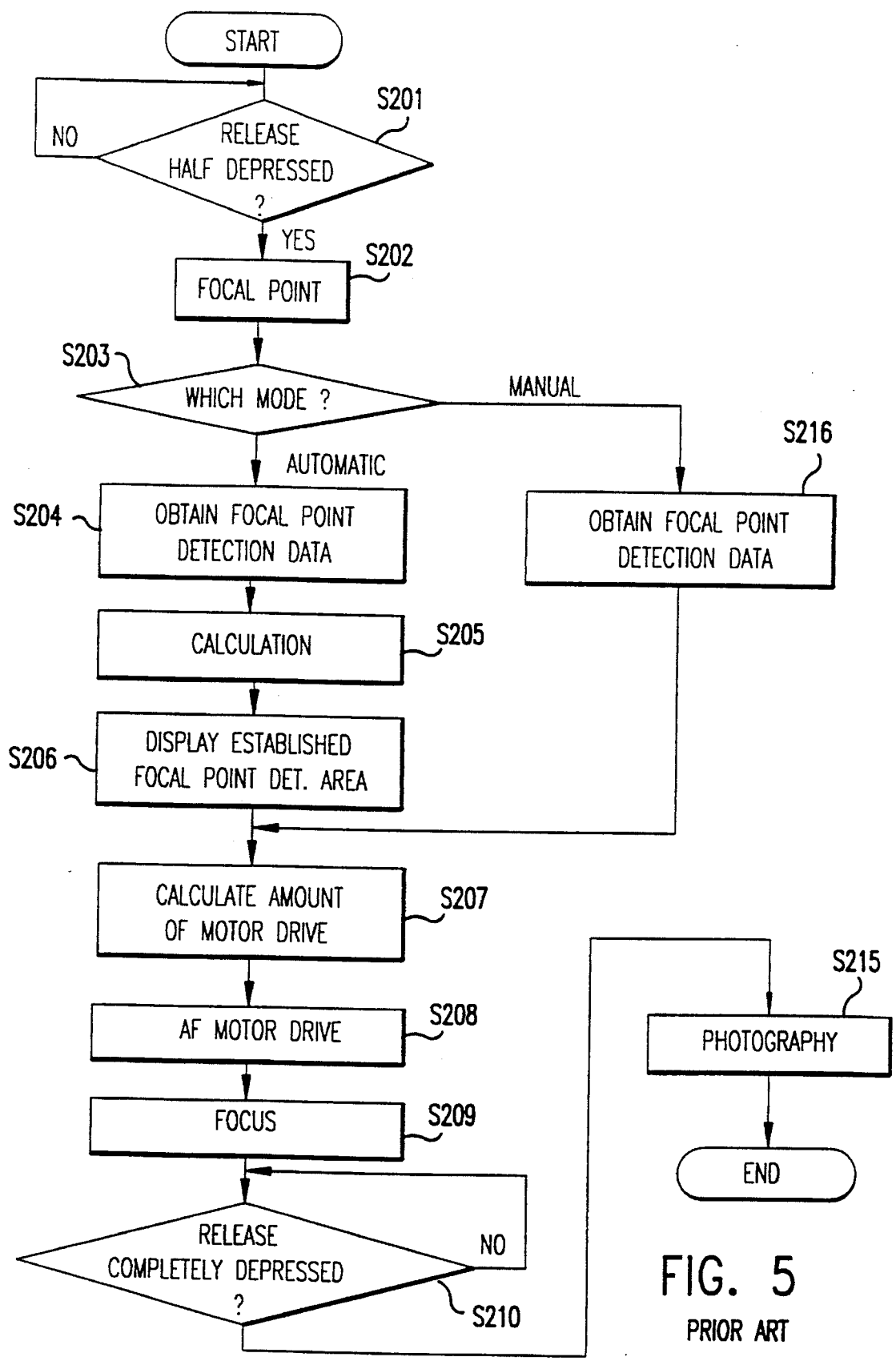
FIG. 5 is an explanatory diagram that shows the operation of a conventional multiple point focus detection camera.

An explanation is provided with respect to the operation of the multiple point focus detection camera according to the present embodiment with reference to FIG. 2.

If the electric power switch 3 is turned on by the photographer, the CPU 41 reads the program stored in memory 45, on the basis of which operations are initiated. The mode established by the mode change button and the area selected by the area selection lever 7 when the established mode is manual, are stored by the CPU 41 in memory 46.

In step S101, the CPU waits until a signal is sent from the release button 4 indicating that it is half depressed. When a half depression signal is sent from the release button 4, the CPU 41 in step S102 directs the focus detection by the AF sensor 37 through the focus detection data selection component 42. The light rays passing through the focusing lens system 31 are guided and deflected to the AF sensor 37 by the mirror 36, the AF sensor 37 accomplishing focus detection relevant to the photographic subject corresponding to the focus detection areas 58a–58c through the utilization of these light rays. The amount of aberration between the focus of the focusing lens system 31 and that of the subject (focus detection data) is sent to the focus detection data selection component.

At the time the CPU 41 requests the transmission of the necessary focus detection data to the focus detection data selection component 42, the CPU 41 reads the mode stored in memory 46, and, if the mode is the automatic mode, the CPU requests that the focus detection data of the three focus detection areas 58a–58c be output to the CPU 41. If the mode stored in memory 46 is the manual mode, then only the focus detection data of the focus detection area stored in memory 46 is transmitted to the CPU 41 (step S103). The focus detection data selection component 42 selects the necessary focus detection data and sends it to the CPU 41, which receives it (steps S104 and S116).

When in the manual mode, the CPU 41 utilizes the focus detection data of the focus detection area received in step S116 and calculates the amount of drive of the AF motor 39 corresponding to the amount of movement required of focusing lens system 31 in order to focus. Also, the CPU sends the amount of drive to the AF motor control component 40, to which drive is directed (step S118).

The CPU 41 drives the AF motor 39, focusing the focusing lens system 31 (steps S119 and S120). In other words, the AF motor control component 40 causes the AF motor 39 to be driven by a specified amount on the basis of a signal that manifests the amount of drive and that was sent from the CPU 41, the driving force that passes through the gear set 38 within the camera and the coupling 34 and 33 being transmitted to the gear set 32 within the lens, and the focusing lens system 31 being moved to the focusing position, where the focusing function is terminated.

In this instance, the CPU 41 waits until the release button 4 is fully depressed upon which a photography directive is issued and photography is accomplished (steps S121 and S122).

In the automatic mode, the CPU 41 processes the focus detection data of the three focus detection areas 58a–58c obtained in step S104, by means of a well known algorithm. A judgment is made as to in which of the three focus detection areas 58a, etc., the primary photographic subject resides, and focusing is accomplished in the established area (step S105). Following the establishment of the area by the CPU 41, a signal is sent to the focus detection area display 43, and a display is accomplished to differentiate the established focus detection area (i.e. focus detection area 58a), from the other areas (step S106).

The CPU 41 makes selective use of the focus detection data in the established focus detection area 58a and calculates the amount of drive of the AF motor 39 corresponding to the amount of movement of the focusing lens system 31 required to focus the focusing lens system 31. The amount of drive is sent to the AF motor control component 40 (step S107).

The CPU 41 drives the AF motor 39 through the AF control component 40, focusing the lens system 31 (steps S108 and S109). The AF control component 40 drives the AF motor 39 (step S108) a specified amount on the basis of a signal that is received from the CPU 41. The drive force is transmitted through the gear set 38 within the camera, as well as couplings 34 and 33 and is transmitted to a gear set 32 within the lens, the focusing lens system 31 being moved until it reaches the focus point, thereby completing focusing.

In this instance, if the release button 4 is completely depressed, the calculation control component 41 effects photography (steps S110 and S115). If the release button 4 is not fully depressed, the CPU starts a timer, and a focus detection area change can be received in step S113, until the passage of a predetermined specified amount of time. When the focus detection area selection lever 7 is operated within this specified amount of time, the CPU 41 reads the area selected by the focus detection area selection lever 7 and stores it in memory 46, thereafter resetting the timer (step S114), and returning to step S116. Also, the focus detection area is displayed, and a calculation is made as to the amount of drive required for the AF motor 39 to focus the focus lens system 31 in the focus detection area, and the AF motor 39 is driven (steps S107-S109).

In steps S112 and S113, if a specified amount of time has passed without a change in the focus detection area, the CPU waits until the release button 4 is fully depressed, upon which the CPU 41 effects photography (step S115).

As indicated above and in accordance with the present embodiment, when photography is accomplished in the automatic mode, if the desired focus detection area is not selected, it is possible for the photographer to change the focus detection area. For this purpose, focusing can be accurately accomplished on the primary subject intended by the photographer. In addition, the operation in the conventional art, in which photography was interrupted requiring a change to the manual mode by the mode change button 6 and selection of a different focus detection area 7 is unnecessary. Moreover, in the conventional art, it was necessary to actuate a button or other switch to return to the automatic mode after the manual mode was selected by the selection mode change means. This is not needed with the present embodiment of the invention. Instead, the focus detection area can be changed while in the automatic mode, maintaining the automatic mode for the next photographic opportunity.

In an alternative arrangement, referring to step S121 in FIG. 2, by changing the construction steps to be the same as those in steps S110 to S114, the focus detection area can be changed in the manual mode. In this instance, in step S120, following focusing of the focusing lens system, since the focus detection area can be changed, and since there is no need for a half depression of the release button, there is no need to leave the disposition of the shutter up to chance, and the focus detection area can be changed.

The invention can be practiced with cameras having structures different from the described camera. For example, other button/dial and/or switching arrangements can be provided to input data such as the mode that is selected. Additionally, although the preferred embodiment used a focussing technique in which a defocus amount was determined based on the current position of the lens, the invention also is applicable to other focussing techniques, for example, where the distance from the camera to the primary photographic subject is measured and the lens is driven to a position appropriate for the measured distance.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A multiple point focus detection camera for accomplishing focus detection from multiple focus detection areas, the camera comprising:

a movable lens system having a lens;

an automatic focus system coupled to said lens system for detecting a focus condition of said multiple focus detection areas and automatically selecting one of said multiple focus detection areas on the basis of said focus condition;

a switch for initiating the automatic focus detection system;

a selection lever for selecting one of said multiple focus detection areas; and a controller for changing said selected one of said multiple focus detection areas that has been initiated by said switch to another of said multiple focus detection areas in accordance with said selection lever.

2. A multiple point focus detection camera according to claim 1, further comprising a timer for preventing changing of said selected one of said multiple focus detection areas after a predetermined time.

3. A multiple point focus detection camera according to claim 1, wherein if said controller changes said selected one of said multiple focus detection areas to said another of said multiple focus detection areas, said controller controls said automatic focus system to focus said lens on said another of said multiple focus detection areas.

4. A multiple point focus detection camera according to claim 1, further comprising a display that displays the selected one of said multiple focus detection areas and said another of said multiple focus detection areas.

5. A multiple point focus detection camera according to claim 2, wherein said controller changes said selected one of said multiple focus detection areas when said selection lever is actuated after said automatic focus system selects one of said multiple focus detection areas.

6. A multiple point focus detection camera according to claim 5, wherein said controller changes said selected one of said multiple focus detection areas only if said selection lever is displaced within a predetermined time.

7. A multiple point focus detection camera according to claim 6, said timer timing said predetermined time and resetting said predetermined time if said selected one of said multiple focus detection areas is changed.

8. A multiple point focus detection camera for accomplishing focus detection from multiple focus detection areas, the camera comprising:

a mode setting switch shiftable between two positions corresponding to an operation mode, said operation mode being one of an automatic mode and a manual mode;

a movable lens system having a lens;

an automatic focusing system operatively coupled to said movable lens system;

a switch for initiating the automatic focusing system; and a controller operatively coupled to said mode setting switch and to said automatic focusing system, said controller selecting one of said multiple focus detection areas in accordance with either focus detection data or a focus detection area selection lever, and controlling said automatic focusing system to focus said lens on the selected one of said multiple focus detection areas, said controller enabling changing of said selected one of said multiple focus detection areas to another of said multiple focus detection areas without changing the operation mode.

9. A multiple point focus detection camera according to claim 8, wherein said automatic focusing system comprises a motor driving a position of said lens through a coupling and a gear set, said controller controlling said motor to focus said lens, the multiple focus detection camera further comprising a timer, said controller preventing changing of said selected one of said multiple focus detection areas after a predetermined time.

10. A multiple point focus detection camera according to claim 8, wherein in the automatic mode, said controller automatically selects said one of said multiple focus detection areas in accordance with said focus detection data, and wherein if said controller changes said selected one of said multiple focus detection areas to another of said multiple focus detection areas, said controller controls said automatic focusing system to focus said lens on said another of said multiple focus detection areas.

11. A multiple point focus detection camera according to claim 10, wherein in the manual mode, said controller selects said one of said multiple focus detection areas in accordance with said focus detection area selection lever, and wherein if said controller changes said selected one of said multiple focus detection areas to another of said multiple focus detection areas, said controller controls said automatic focusing system to focus said lens on said another of said multiple focus detection areas.

12. A multiple point focus detection camera according to claim 8, further comprising a display that displays the selected one of said multiple focus detection areas and said another of said multiple focus detection areas.

13. A multiple point focus detection camera according to claim 8, wherein said controller changes said selected one of said multiple focus detection areas when said focus detection area selection lever is actuated after said controller selects one of said multiple focus detection areas.

14. A multiple point focus detection camera according to claim 13, wherein said controller changes said selected one of said multiple focus detection areas only if said focus detection area selection lever is displaced within a predetermined time.

15. A multiple point focus detection camera according to claim 14, further comprising a timer that times said predetermined time, said timer resetting said predetermined time if said selected one of said multiple focus detection areas is changed.

16. A multiple point focus detection camera according to claim 8, wherein said controlled is a CPU.

17. A method of focus detection from multiple focus detection areas in a multiple point focus detection camera having a movable lens system with a lens and an automatic focusing system, the method comprising:

setting an operation mode, the operation mode being one of an automatic mode and a manual mode;

selecting one of said multiple focus detection areas in accordance with either focus detection data or a focus detection area selection lever;

controlling said automatic focusing system to focus said lens on the selected one of said multiple focus detection areas based on an initialization switch; and enabling changing of said selected one of said multiple focus detection areas to another of said multiple focus detection areas in accordance with said selection lever without changing the operation mode.

18. A method according to claim 17, further comprising:

determining an amount of lens movement necessary to focus the lens; and preventing changing of said selected one of said multiple focus detection areas after a predetermined time.

19. A method according to claim 18, wherein in the automatic mode, the method comprising automatically selecting said one of said multiple focus detection areas in accordance with said focus detection data, and wherein if said selected one of said multiple focus detection areas is changed to another of said multiple focus detection areas, controlling said automatic focusing system to focus said lens on said another of said multiple focus detection areas.

20. A method according to claim 19, wherein in the manual mode, the method comprising selecting said one of said multiple focus detection areas in accordance with said focus detection area selection lever, and wherein if said selected one of said multiple focus detection areas is changed to another of said multiple focus detection areas, controlling said automatic focusing system to focus said lens on said another of said multiple focus detection areas.

21. A method according to claim 17, further comprising displaying the selected one of said multiple focus detection areas and said another of said multiple focus detection areas.

22. A method according to claim 17, wherein in said enabling step, said selected one of said multiple focus detection areas is changed in accordance with said focus detection area selection lever.

23. A method according to claim 22, wherein said selected one of said multiple focus detection areas is changed only if said focus detection area selection lever is displaced within a predetermined time.

24. A method according to claim 23, further comprising resetting said predetermined time if said selected one of said multiple focus detection areas is changed.

25. A multiple point focus detection camera according to claim 1, wherein following the change to another of said multiple focus detection areas, the controller returns to the selected one of the multiple focus detection areas corresponding to reoperation of the switch.

26. A multiple point focus detection camera according to claim 8, wherein following the change to another of said multiple focus detection areas, the controller returns to the selected one of the multiple focus detection areas corresponding to reoperation of the switch.

27. A method according to claim 17, wherein after changing to another of said multiple focus detection areas, a return is included back to the selected one of the multiple focus detection areas by reoperating the initialization switch.

* * * * *